(12) United States Patent
Chen et al.

(10) Patent No.: US 7,852,324 B2
(45) Date of Patent: Dec. 14, 2010

(54) PROCESS OF INTEGRATING A DIGITIZER INPUT DEVICE IN A DISPLAY

(75) Inventors: Dinguo Chen, Taipei (TW); Yingchih Lee, Shengang Township (TW)

(73) Assignee: TPO Displays Corp., Chu-Nan (TW)

( * ) Notice: Subject to any disclaimer, the term of this patent is extended or adjusted under 35 U.S.C. 154(b) by 1177 days.

(21) Appl. No.: 11/490,835

(22) Filed: Jul. 21, 2006

(65) Prior Publication Data

US 2007/0018969 A1 Jan. 25, 2007

Related U.S. Application Data (63) Continuation-in-part of application No. 11/311,986, filed on Dec. 20, 2005.

(60) Provisional application No. 60/701,160, filed on Jul. 21, 2005, provisional application No. 60/701,297, filed on Jul. 21, 2005.

(51) Int. Cl.
*G09G 5/00* (2006.01)

(52) U.S. Cl. .................................... 345/173; 178/18.01

(58) Field of Classification Search .................. 345/156, 345/173, 87, 104, 178; 178/18.01, 18.07; 382/115

See application file for complete search history.

(56) References Cited

U.S. PATENT DOCUMENTS

| 5,644,653 | A | 7/1997 | Sunakawa et al. |
| 5,670,755 | A * | 9/1997 | Kwon ........................ 178/18.05 |
| 5,821,916 | A | 10/1998 | Watson et al. |
| 6,285,417 | B1 | 9/2001 | Ahn et al. |
| 6,388,729 | B2 * | 5/2002 | Ahn et al. .................... 349/190 |
| 6,661,399 | B1 * | 12/2003 | Oh et al. ........................ 345/87 |
| 7,196,695 | B2 | 3/2007 | Lin |
| 7,298,367 | B2 | 11/2007 | Geaghan et al. |
| 2005/0133279 | A1 | 6/2005 | Thacker |

FOREIGN PATENT DOCUMENTS

| CN | 1286424 | 3/2001 |
| CN | 1534333 | 10/2004 |
| JP | 09-080467 | 3/1997 |
| JP | 09-258893 | 10/1997 |
| JP | 11-271712 | 10/1999 |
| JP | 2001-183630 | 7/2001 |
| JP | 2003-196023 | 7/2003 |

* cited by examiner

*Primary Examiner*—Abbas I Abdulselam
(74) *Attorney, Agent, or Firm*—Liu & Liu (57) ABSTRACT

A process for integrating digitizer sensor array into flat panel displays. The sensor array is formed on the side of the display element (e.g., LC layer or OLED layer) where the pixel control switches (e.g., thin film transistors (TFTs)) of the display module are present, or on the other side of the display element where the pixel control switches are not present. In particular, the sensor array may be formed (a) before planarization layer of the pixel control switches, (b) after forming the planarization layer of the pixel control switches, (c) prior to forming the pixel control switches (e.g., formed on the substrate, before or after forming an electrode on the substrate), and/or (d) formed above or below a color filter layer, e.g., in the case of an LCD module, or above or below the encapsulating layer, e.g., in the case of an OLED display module.

18 Claims, 13 Drawing Sheets

PROCESS OF INTEGRATING A DIGITIZER INPUT DEVICE IN A DISPLAY

This application claims the benefits of the priority of Provisional Patent Application No. 60/701,160 and Provisional Patent Application No. 60/701,297, which were filed Jul. 21, 2005; and this application is a continuation-in-part of U.S. patent application Ser. No. 11/311,986, filed Dec. 20, 2005; these patent applications are fully incorporated by reference, as if fully set forth herein. All other publications and U.S. patent applications disclosed herein below are also incorporated by reference, as if fully set forth herein.

BACKGROUND OF THE INVENTION

1. Field of the Invention

The present invention relates generally to flat panel displays, and particularly to a two-dimensional position-detecting digitizer input device for use in flat panel displays, and more particularly to a process for integrating a digitizer input device in a flat panel display.

2. Description of Related Art

Flat panel displays, such as liquid crystal displays (LCD) and organic light-emitting diode (OLED) displays, are becoming ubiquitous for displaying images. One type of LCD is provided with a two-dimensional position-detecting user input device (i.e., a digitizer) to allow user input, such as user interactivity with respect to images displayed (e.g., selecting an icon), handwriting recognition, drawing, cursor control, etc. This type of LCD is often referred to as a "touch panel" LCD. The digitizer may be based on sensing mechanisms such as resistive sensing, capacitive sensing, infrared sensing, acoustic wave sensing, force sensing, electromagnetic sensing, etc.

For an electromagnetic touch panel, the underlying operational principle is magnetic induction. There are three main components for magnetic inductive input, including a two dimensional sensor array, an electromagnetic pen, and a controller operatively coupled to the sensor array and the electromagnetic pen. The electromagnetic pen acts as a signal transceiver, the sensor array acts as a signal receiver, and the controller determines the two-dimensional coordinates of the pen with respect to the sensor array by detecting the current change as a result of magnetic induction in the sensor array caused by a change in magnetic flux brought about by the pen. As a result, as the pen is moved about with respect to the sensor array, the two-dimensional coordinates of the pen (i.e., X-Y coordinates) relative to the display surface can be determined by the controller. Electromagnetic digitizers provide relatively accurate position detection of the pen, in relatively good resolution compared to some of the other forms of sensing mechanisms.

Figure 1:
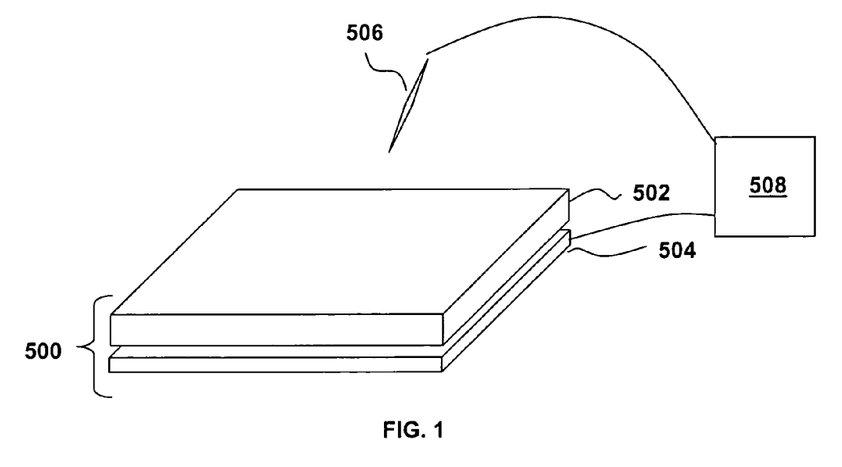
FIG. 1 is a schematic representation of a conventional flat panel display.

Heretofore electromagnetic digitizers have been implemented in a flat panel display by simply by assembling a discrete digitizer module with a display module. FIG. 1 schematically illustrates a conventional flat panel display 500 having a flat panel display module 502 (e.g., an LCD module) and a separate electromagnetic digitizer board 504 assembled in a stack. For example, the digitizer board 504 is attached to one planar surface of the display module 502. A controller 508 is operatively coupled to the digitizer board 504 and a complementary electromagnetic pen 506. The digitizer board 504 includes a sensor array, which is formed by conventional printed circuit technology, with sensor array structures fabricated by printing technology. Printed circuit technology involves relatively large physical sizes and low resolution, as compared to semiconductor circuit fabrication technology. The sensor array includes metal conductive lines with a line width on the order of several hundred micrometers, as compared to semiconductor fabrication technology, involving line width on the order of micrometers. To achieve the desired sensitivity, the physical dimension of the sensor array tends to be relatively bulky. Further, given that the conventional electromagnetic digitizer board 504 is a separate and discrete component attached to the display module 502, it adds to the thickness and weight of the overall flat panel display 500.

U.S. Patent Application Publication No. US20060146033A1 (an application commonly assigned to the assignee of the present invention) discloses integrating a digitizer input device into a flat panel display, which reduces the overall thickness and weight of the flat panel display. Co-pending U.S. patent application Ser. No. 11/490,834, filed concurrently herewith, discloses miniaturized digitizer sensor array structures that can be integrated into flat panel display devices.

It is desirable to provide improved processes for integrating digitizer sensor arrays in flat panel displays.

SUMMARY OF THE INVENTION

The present invention provides improved processes for integrating digitizer sensor array into flat panel displays. The sensor array comprises novel sensor segment structures that are particularly suitable for integration into the display module of a display device (e.g., an LCD module of an LCD device or an OLED module of an OLED device).

In one aspect of the present invention, the sensor array is formed as a layer or layers integrated within the various layers in the display module using semiconductor fabrication processes, as opposed to attached to the outside of the display module as practiced in the prior art. The sensor array may be formed on the side of the display element (e.g., LC layer or OLED layer) where the pixel control switches (e.g., thin film transistors (TFTs)) of the display module are present, or on the other side of the display element where the pixel control switches are not present. For example, the sensor array may be formed (a) before planarization layer (or contact hole formation layer) of the pixel control switches (e.g., formed between the data line and the planarization layer), (b) after forming the planarization layer of the pixel control switches (e.g., formed after ITO patterning), (c) prior to forming the pixel control switches (e.g., formed on the substrate, before or after forming an electrode on the substrate), and/or (d) formed above or below a color filter layer above the display element, e.g., in the case of an LCD module, or above or below the encapsulating layer, e.g., in the case of an OLED display module.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

By way of illustration and not limitation, the present invention will be described in connection with flat panel LCD and OLED display devices, respectively having an LCD module and an OLED module as the display module, which respectively rely on LC elements and OLED elements as the display elements that can be controlled to render an image. Further, the present invention will be described in connection with an electromagnetic digitizer. As will be evident from the disclosure below, the present invention is suitable for forming other types of digitizers, which may be incorporated in other types of display devices, flat panel or otherwise, having display modules comprising other types of display elements, such as cathode ray tubes (CRT), organic light emitting diode light emitting elements (OLED), field emission display (FED) elements, plasma light emitting elements, fluorescence light emitting elements, chemiluminescent light emitting elements, and other types of light emitting elements. The reference to "flat panel" displays herein includes displays having rigid, semi-rigid and flexible substrates and/or panels.

It is noted that the description hereinbelow refers to various layers arranged on, above or overlying other layers, to describe the relative positions of the various layers. References to "on", "above", "overlying", or other similar languages, are not limited to the interpretation of one layer being immediately adjacent another layer. Similarly, references to steps undertaken "before", "after", "subsequent to", "prior to", "following" or the like, are not limited to the interpretation of steps being undertaken immediately from one to another. There may be intermediate or interposing layers, coatings, or other structures present, and associated process steps present, which are not shown or discussed herein, but could be included without departing from the scope and spirit of the invention disclosed herein. Similarly, references to structures adjacent, between or other positional references to other structures merely describe the relative positions of the structures, with or without intermediate structures.

Figure 2:
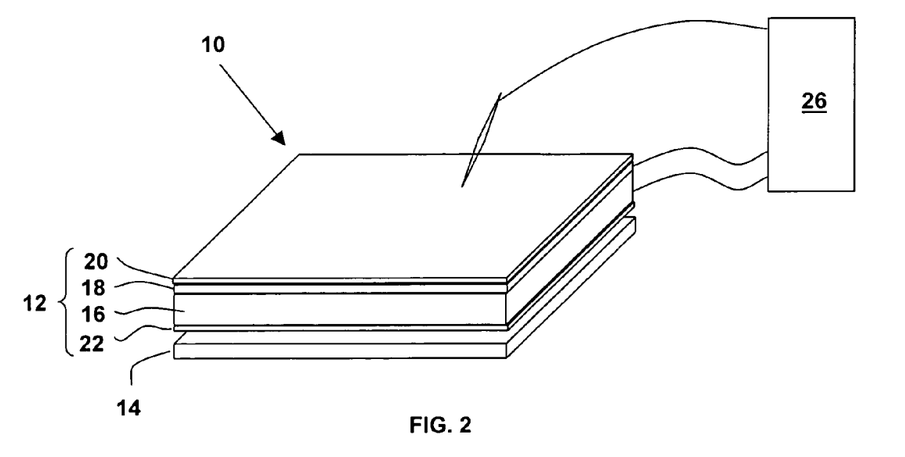
FIG. 2 is a schematic representation of a display device, including a display module incorporating the inventive electromagnetic digitizer, in accordance with one embodiment of the present invention.
Figure 3:
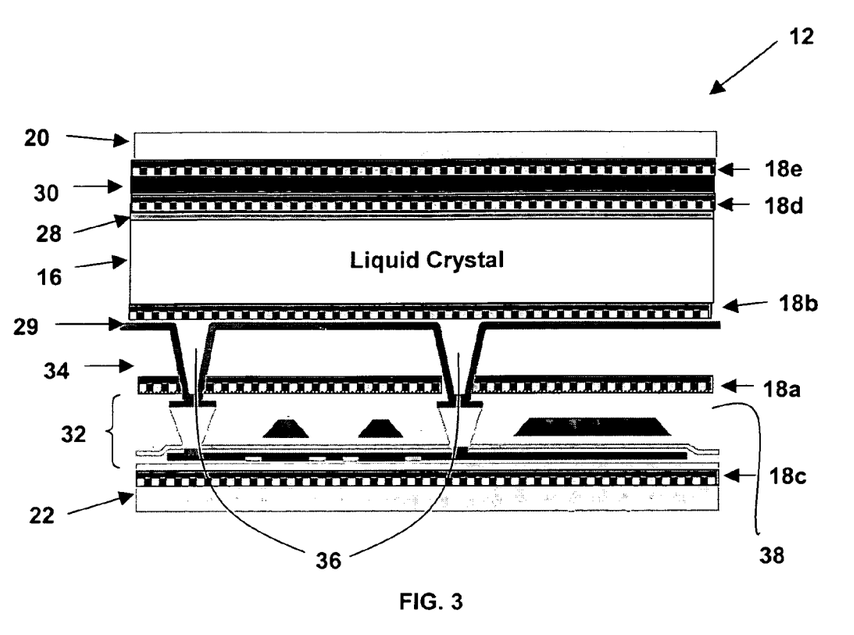
FIG. 3 is a schematic sectional view of an LCD module, in accordance with one embodiment of the present invention.

FIG. 2 illustrates a flat panel type display device 10 in accordance with one embodiment of the present invention, which includes an LCD module 12, and a backlight module 14 optically coupled to the LCD module 12. The LCD module 12 includes an LC layer 16, supported between two substrates 20 and 22, which can be controlled to regulate and/or filter light transmission to render a composite image based on pixilated image elements. Additional components have been omitted from FIG. 2, to simplify the structure for purpose of disclosing the inventive concept. For example, typically there are layers such as electrode layers, pixel control switches (e.g., thin film transistor (TFT) array), masking layers, LC alignment layers, color filter layers, and reflection layers within the LCD module 12 (some of these layers are shown in FIG. 3), and other layers such as diffuser layers, brightness enhancement layers and protective layers, which are position relative to the LCD module 12 within display device 10, which have been omitted for the sake of simplicity. Such layers in and by themselves are well known in the art, and will not be elaborated herein. The backlight module 14 may comprise a light source (not shown) that is positioned at an edge or at a planar side. In operation of the LCD module 10, light from the backlight module 14 is regulated, modulated and/or filtered by the LC layer 16, to render an image in accordance with an image data. A controller 26 controls the operation of the LCD module 10 (i.e., effecting control of the LC layer 16 via electrodes and drivers (not shown)). The controller 26 may be a part of the display device 10, and/or a part of a computing device to which the display device 10 is operatively attached.

According to one embodiment of the present invention, an electromagnetic digitizer 18 having the novel sensor segment structure of the present invention is supported between the LC layer 16 and the substrate 20, which is operatively coupled to the controller 26. Alternatively, the digitizer 18 may be positioned at other locations within the LCD module 12, for example between the LC layer 16 and the substrate 22, or at another intermediate layer location between the substrates 20 and 22 of the LCD module 12, as will be disclosed in further details below in reference to FIG. 3, for example. As can be appreciated, the digitizer 18 is integrated into the layers of the LCD module 12 of the display device 10, as opposed to the prior art display devices in which the digitizer panel is provided as a separate component outside the display module (e.g., outside the substrates of the LCD module as shown in FIG. 1). The overall size of the display device 10 is therefore reduced.

To complement the operation of the electromagnetic digitizer 18, a stylus 24 (e.g., in the shape of a pen) is provided. The stylus 24 is operatively coupled to the controller 26, either wirelessly or by a wire. The stylus 24 may include one or more button switches, which may be used to select certain input related modes or functions when pressed by a user (e.g., handwriting recognition mode, point and click mode, etc.) The stylus includes a magnetic element, which may be a permanent magnet or an electromagnet. As the stylus is moved across the substrate 20, its relative positional coordinates can be determined by the controller 26, based on a change in magnetic flux detected by the sensor segments within the electromagnetic digitizer. The basic operational principles of electromagnetic digitizers are well known in the art, and such would not be necessary to be disclosed here.

The controller 26 controls and synchronizes the operations of the display module 12 including the digitizer, and the stylus. Images are controlled to be displayed by the display module 12, which may require user input by using the stylus to interact with the displayed image (e.g., making a selection by tapping on the display module, drawing or handwriting input by moving the stylus on the display module).

Reference is made to concurrently filed U.S. patent application Ser. No. 11/490,834, which has been commonly assigned to the assignee of the present invention, for further disclosure of various structures of sensor segments and sensor arrays of the digitizer 18, which are particularly suitable for integration within a display module such as an LCD module, and the control thereof. Further, reference is also made to U.S. Patent Application Publication No. US20060146033A1 (an application commonly assigned to the assignee of the present invention), which discloses integrating a digitizer input device into a flat panel display. These applications have been fully incorporated by reference, as if fully set forth herein.

In one aspect of the present invention, the sensor array is formed as a layer or layers integrated within the various layers in the display module using semiconductor fabrication processes, as opposed to attached to the outside of the display module as practiced in the prior art. The sensor array may be formed on the side of the display element (e.g., LC layer or OLED layer) where the pixel control switches (e.g., thin film transistors (TFTs)) of the display module are present, or on the other side of the display element where the pixel control switches are not present. For example, the sensor array may be formed (a) before planarization layer (or contact hole formation layer) of the pixel control switches (e.g., formed between the data line and the planarization layer), (b) after forming the planarization layer of the pixel control switches (e.g., formed after ITO patterning), (c) prior to forming the pixel control switches (e.g., formed on the substrate, before or after forming an electrode on the substrate), and/or (d) formed above or below a color filter layer above the display element, e.g., in the case of an LCD module, or above or below the encapsulating layer, e.g., in the case of an OLED display module.

FIG. 3 is a schematic sectional view of the LCD module 12, indicating some of the possible locations of a digitizer 18 within the LCD module 12. (For simplicity, and for better reference, such possible alternative locations are shown together in FIG. 3, but they are not meant to be present concurrently at all the locations within the LC module 12. The digitizer may be alternatively located at 18a, 18b, 18c, 18d and 18e). In the embodiment shown in FIG. 3, the LCD module 12 includes the substrates 20 and 22, which may be glass. Sandwiched between the substrates 20 and 22 is the LC layer 16, electrodes 28 and 29 about the LC layer 16 (which are used to provide a voltage bias across the LC layer 16 to regulate and/or filter light transmission to render a composite image based on pixilated image elements), a color filter 30 below the top substrate 20, and a TFT array 32 between the LC layer 16 and the bottom substrate 22. A planarization layer 34 (or contact hole formation layer) is provided between the TFT array 32 and the LC layer 16, through which vias of contact holes 36 are formed, through which electrical connections are made between the electrode 29 and the TFT array 32. The details of the TFT array 32 is omitted, since they are not necessary for an understanding of the present invention, and they can take on the structure of any of the conventional TFT arrays found in conventional flat panel display module. It is suffice to mention that the TFT array 32 includes an array of TFTs (each having a channel, and associated gate, source and drain) and complementary storage capacitors, wherein each TFT defined at the node of an array of orthogonal data lines and scan lines. The gate of the TFT is operatively connected to a data line and the source/drain is operatively connected to a scan line. In this view, the output surface of the LCD module 12 is the top substrate 20.

Details of the sensor array of the digitizer 18 are omitted from FIG. 3 for simplicity. The digitizer 18 may include a pair of sensor arrays (e.g., an X-array and a Y-array with sensor segments in the arrays that are orthogonal to each other), but the sensor arrays are collectively represented by the digitizer 18, and will so be collectively referenced hereinbelow. In FIG. 3, five possible locations of the digitizer 18 are indicated within the LCD module 12. Three of the locations 18a, 18b and 18c are present on one side of the LC layer 16, the side at which the TFT array 32 is present. The other two locations 18d and 18e, are adjacent the color filter 30.

Figure 4:
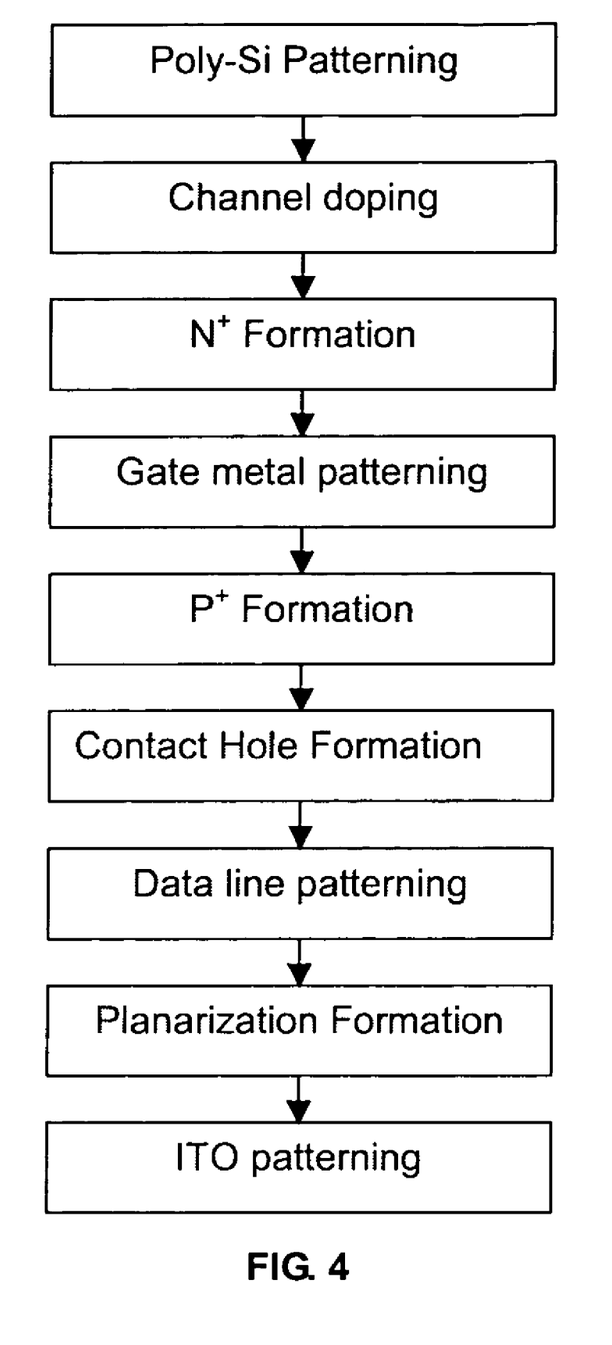
FIG. 4 is a schematic flow diagram representing formation of an LTPS TFT array on a substrate of the LCD module, in accordance with one embodiment of the present invention.
Figure 6:
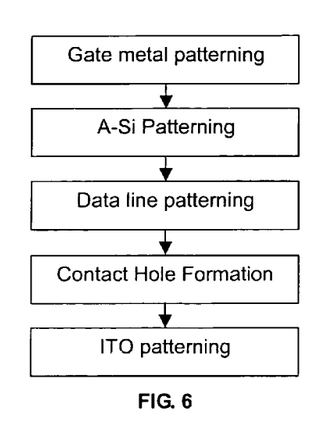
FIG. 6 is a schematic flow diagram representing formation of an a-Si TFT array on a substrate of the LCD module, in accordance with one embodiment of the present invention.

The TFT array 32 may comprise TFTs that are of amorphous silicon (a-Si) type or low temperature polysilicon silicon (LTPS) type. The processes for forming the two types of TFTs involve certain common steps, but the LTPS TFT requires additional steps unique to an LTPS TFT. FIG. 4 is a diagram illustrating the flow process of forming a LTPS TFT, and FIG. 6 is a diagram illustrating the flow process of forming an a-Si TFT. The details of the steps in these processes have been omitted, as they may involve conventional patterning and photolithographic steps well known in semiconductor processing, such as masking, exposure, doping, deposition, etching, etc., to form structures having desired patterns and conductive properties (including the digitizer sensor arrays).

As shown in FIG. 4, in the case where the TFT array 32 is an array of LTPS TFTs, the process for forming such includes generally the steps for forming a doped poly-Si channel region, a gate, and a source region and a drain regions (e.g., N+ and/or p+ regions). A data line is patterned to couple to the gate of the TFT via a contact hole in a dielectric layer 38. The resulting structure is covered with a planarization layer (34 in FIG. 3), prior to patterning the transparent electrode layer (29 in FIG. 3; an ITO layer). There are additional intermediate steps not mentioned here, which are required to complete the LC module 12, but which are not essential to an understanding of the present invention.

Figure 5A:
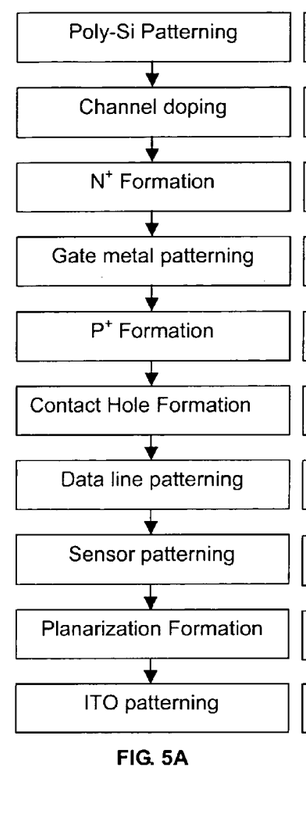
FIGS. 5A to 5C are schematic flow diagrams representing formation of a digitizer sensor array in association with the formation of the LTPS-TFT array, in accordance with one embodiment of the present invention.
Figure 5B:
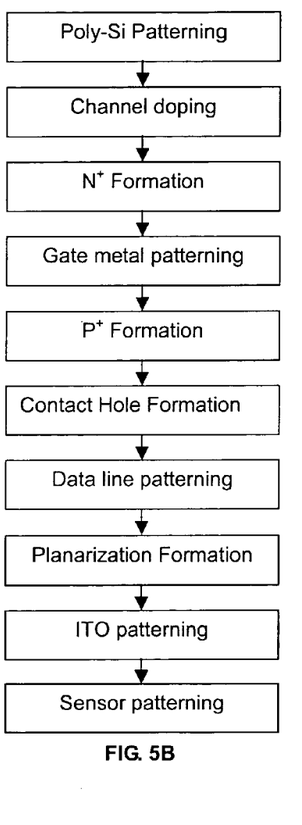
Figure 5C:
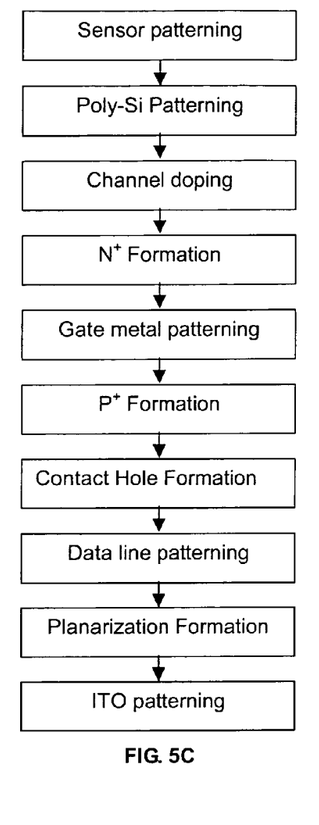

Referring to FIG. 5A, to form the digitizer 18a, the sensor arrays within the digitizer 18a are patterned between formations of the data line and the planarization layer 34. For example, as illustrated, the digitizer 18a is formed on a dielectric layer 38 above the data lines. Other steps not shown are undertaken to complete the LCD module 12. Referring to FIG. 5B, to form the digitizer 18b, the sensor arrays within the digitizer 18b are patterned between formations of the transparent electrode 29 and the LC layer 16. A dielectric layer (not shown) may be provided above the transparent electrode 29 prior to forming the digitizer 18b, followed by formation of the LC layer 16 and the rest of the structures for the LC module 12. Alternatively, referring to FIG. 5C, the digitizer 18c is formed on the bottom substrate 22, prior to forming the TFT array. The sensor arrays of the digitizer 18c may be patterned on the substrate, with or without a buffer layer, followed by the steps to form the LTPS TFT array, and the rest of the LC module 12.

It is noted that similar integration is possible for active matrix LCD (AMLCD), which includes pixel control switches such as a PMOS TFT array, without departing from the scope and spirit of the present invention. The LCD module 12 may include structures not shown, and requiring steps not shown, corresponding to transmissive, transflective, microreflective and reflective type LCD modules.

As shown in FIG. 6, in the case where the TFT array 32 is an array of a-Si TFTs, the process for forming such includes generally the steps for forming a gate, patterning a-Si channel region, patterning data lines, and formation of contact holes in a dielectric layer 38 (which may involve a planarization layer), prior to patterning the transparent electrode layer (29 in FIG. 3; an ITO layer). There are additional intermediate steps not mentioned here, which are required to complete the LC module 12, but which are not essential to an understanding of the present invention.

Figure 7A:
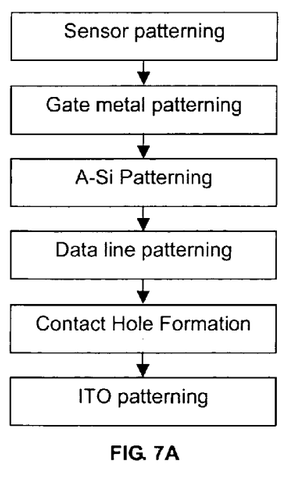
FIGS. 7A to 7C are schematic flow diagrams representing formation of a digitizer sensor array in association with the formation of the a-Si TFT array, in accordance with one embodiment of the present invention.
Figure 7B:
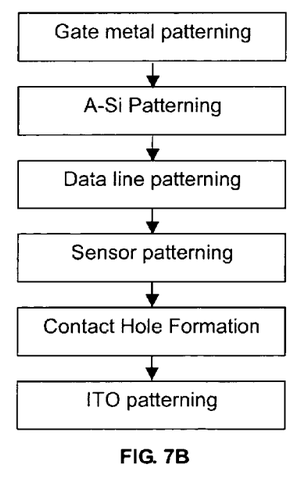
Figure 7C:
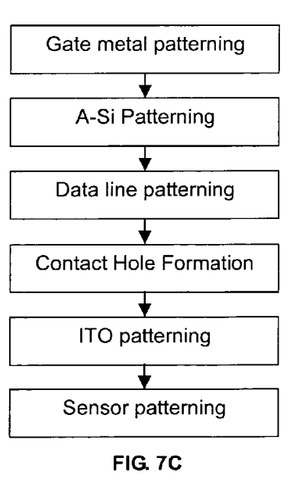

The formation of the digitizer in an LCD display module with an a-Si TFT array is quite similar to the previous embodiment of the LTPS TFT array based LCD module. Referring to FIG. 7A, to form a digitizer at a location similar to digitizer 118c, the sensor arrays of the digitizer is formed on the bottom substrate 22, prior to forming the a-Si TFT array. The sensor arrays of the digitizer 18c may be patterned on the substrate 22, with or without a buffer layer, followed by the steps to form the a-Si TFT array. Alternatively, referring to FIG. 7B, to form a digitizer at a location similar to the digitizer 18a, the sensor arrays within the digitizer are patterned between formation of the data line and contact hole formation. Referring to FIG. 7C, to form the digitizer at a location similar to digitizer 18b, the sensor arrays within the digitizer are patterned between formation of the transparent ITO electrode 29 and the LC layer 16. A dielectric layer (not shown) may be provided above the transparent electrode 29 prior to forming the digitizer 18b.

Figure 8A:
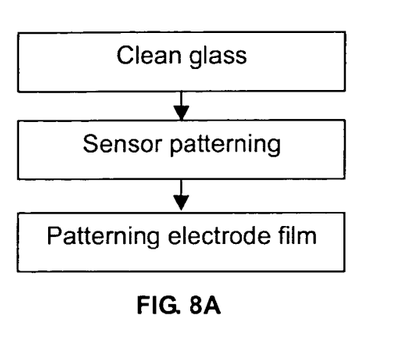
FIGS. 8A to 8B are schematic flow diagrams representing formation of a digitizer sensor array about a front or back electrode near the substrate of the LCD module, in accordance with one embodiment of the present invention.
Figure 8B:
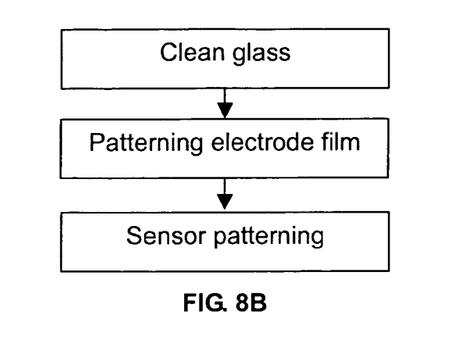

For passive matrix LCD (PMLCD) (not shown), there are several possible arrangements to integrate the digitizer, in reference to FIGS. 8A and 8B. Referring to FIG. 8A, the sensor arrays of the digitizer may be formed on the bottom substrate 22 with or without a buffer layer, similar to the processes in FIGS. 5C and 7A above, prior to forming an electrode for the LC layer. Referring to FIG. 8B, the sensor arrays of the digitizer may be formed after forming the transparent electrode, such as ITO patterning. After formation of transparent electrode, a dielectric layer is deposited, followed by forming the sensor array of the digitizer, as shown in FIG. 8B. Following the steps shown in FIGS. 8A and 8B, respectively, conventional steps are undertaken to complete the PMLCD display, such as forming the LC layer, a top electrode, a color filter 30, and a top substrate 20. If it is desired to locate the digitizer at the side of the LC layer near the top substrate 20, the top substrate 20 may involve a similar process, with respect to the sequence for forming the sensor arrays of the digitizer and the transparent electrode, as shown in FIGS. 8A and 8B. Therefore, the flow processes shown in FIG. 8A and FIG. 8B are applicable for making both top and bottom substrates, depending on where the digitizer is desired.

Figure 9:
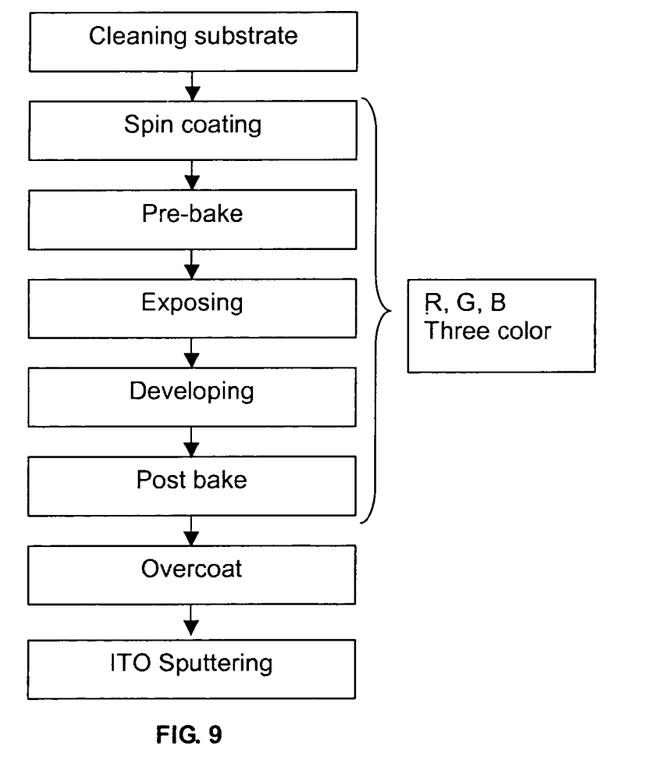
FIG. 9 is a schematic flow diagram representing formation of a color filter on a substrate of the LCD module, in accordance with one embodiment of the present invention.

According to another embodiment of the present invention, a digitizer is integrated with respect to the color filter 30. FIG. 9 is a diagram illustrating the flow process of forming the color filter 30 shown in FIG. 3 (without the digitizer 18). As shown in FIG. 9, the process for forming such a color filter 30 generally includes the steps of substrate cleaning, spin coating of photo resist, pre-baking, exposing and developing of the photo resist, post baking of the developed photo resist, forming an overcoat of buffer or dielectric layer, and ITO sputtering to form the top common electrode 28 of the LC layer 16. This is done to include all the colors desired in the color filter layer 30 (e.g., red, green and blue). The rest of the steps in forming the TFT array 32, LC layer 16, and other components of the display module (with the exception of the digitizer of the present invention) are well known. There are additional intermediate steps not mentioned here, which are required to complete the LC module 12, but which are not essential to an understanding of the present invention.

Figure 10A:
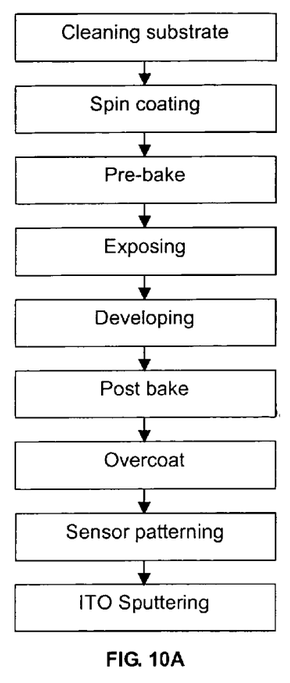
FIGS. 10A to 10C are schematic flow diagrams representing formation of a digitizer sensor array in association with the formation of the color display, in accordance with one embodiment of the present invention.
Figure 10B:
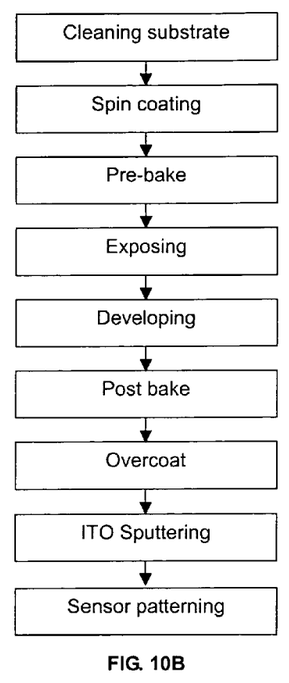
Figure 10C:
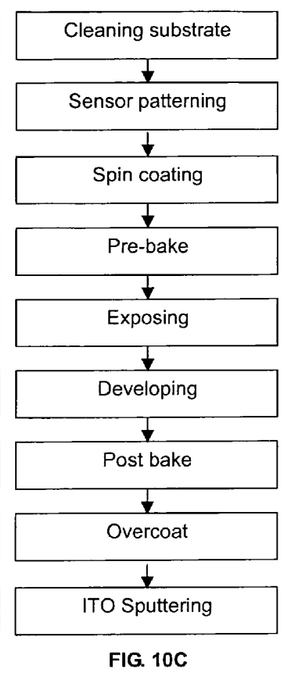

Referring to FIG. 10A, to form the digitizer 18d in FIG. 3, the sensor arrays within the digitizer 18d are patterned between formations of the overcoat and sputtering of the ITO electrode 28. Referring to FIG. 10B, alternatively, the electrode 28 may be formed between the digitizer and the color filter 30 (not shown in FIG. 3). In this case, to form the digitizer below the top electrode 28, the sensor arrays within the digitizer are after formation of the transparent electrode 28 on the top substrate 20. Alternatively, referring to FIG. 10C, the digitizer 18e is formed on the top substrate 20, with or without a buffer layer, prior to forming the color filter 32. The top substrates 20 so formed with color filter 30, top electrode 20 and digitizer 18 can be assembled with the bottom substrate 22 that supports the TFT array 32 (which may be LTPS TFT or a-Si TFT), and providing the LC layer to complete the LC module structure shown in FIG. 3. Other steps not shown are undertaken to complete the LCD module 12.

The foregoing implementation of a digitizer in association with a color filter is applicable to PMLCD, without departing from the scope and spirit of the present invention.

Figure 11:
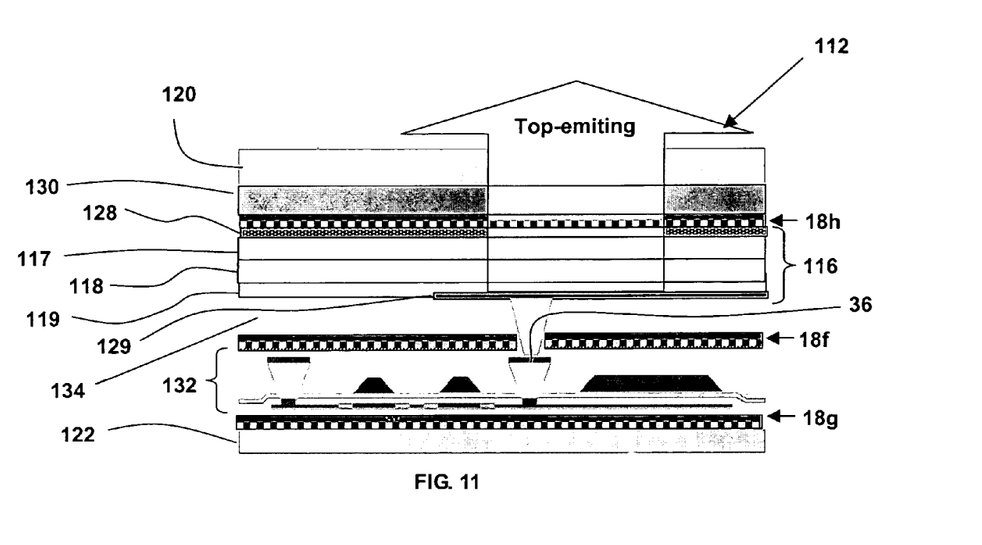
FIG. 11 is a schematic sectional view of an OLED module, in accordance with one embodiment of the present invention.

FIG. 11 is a schematic sectional view of an OLED module 112 (having OLEDs as the display element), which, in this embodiment, is an active matrix OLED (AMOLED) module, and which indicates some of the possible locations of a digitizer 18 within the OLED module 112. (For simplicity, and for better reference, such possible alternative locations are shown together in FIG. 11, but they are not meant to be present concurrently at all the locations within the OLED module 112. The digitizer may be alternatively located at 18f, 18g, and 18h). In the embodiment shown in FIG. 11, the OLED module 112 includes a substrate 120 and 122, which may be glass. Between the substrates 120 and 122 is an OLED layer 116 (which generally comprises various sub-layers, including an electron transport layer 117, emissive layer 118 and hole transport layer 119), electrodes 28 (cathode) and 29 (anode) of the OLED layer 116 (which are used to provide a potential to drive the OLED layer 116 to emit light), an encapsulating layer 130 below the top substrate 20 (e.g., a glass cover of the overall structure), and a TFT array 32 between the LC layer 16 and the bottom substrate 122. A planarization layer 134 is provided between the TFT array 132 and the OLED layer 116, through which vias of contact holes 136 are formed, through which electrical connections are made between the electrode 129 and the TFT array 132.

The digitizer 18 in this embodiment is similar to the previous embodiments. In FIG. 11, three possible locations of the digitizer 18 are indicated within the OLED module 112. Two of the locations 18f and 18g are present on one side of the OLED layer 116, the side at which the TFT array 132 is present. The other location 18f is adjacent the encapsulation layer 30.

The TFT array 132 may comprise LTPS TFTs and/or a-Si TFTs, similar to the TFT array 32 disclosed in connection with the LCD module 12. As such, the process for forming the digitizers 18f and 18g could be similar to the processes for digitizers 18a and 18c disclosed above in connection with FIGS. 5A and 5C.

Figure 12:
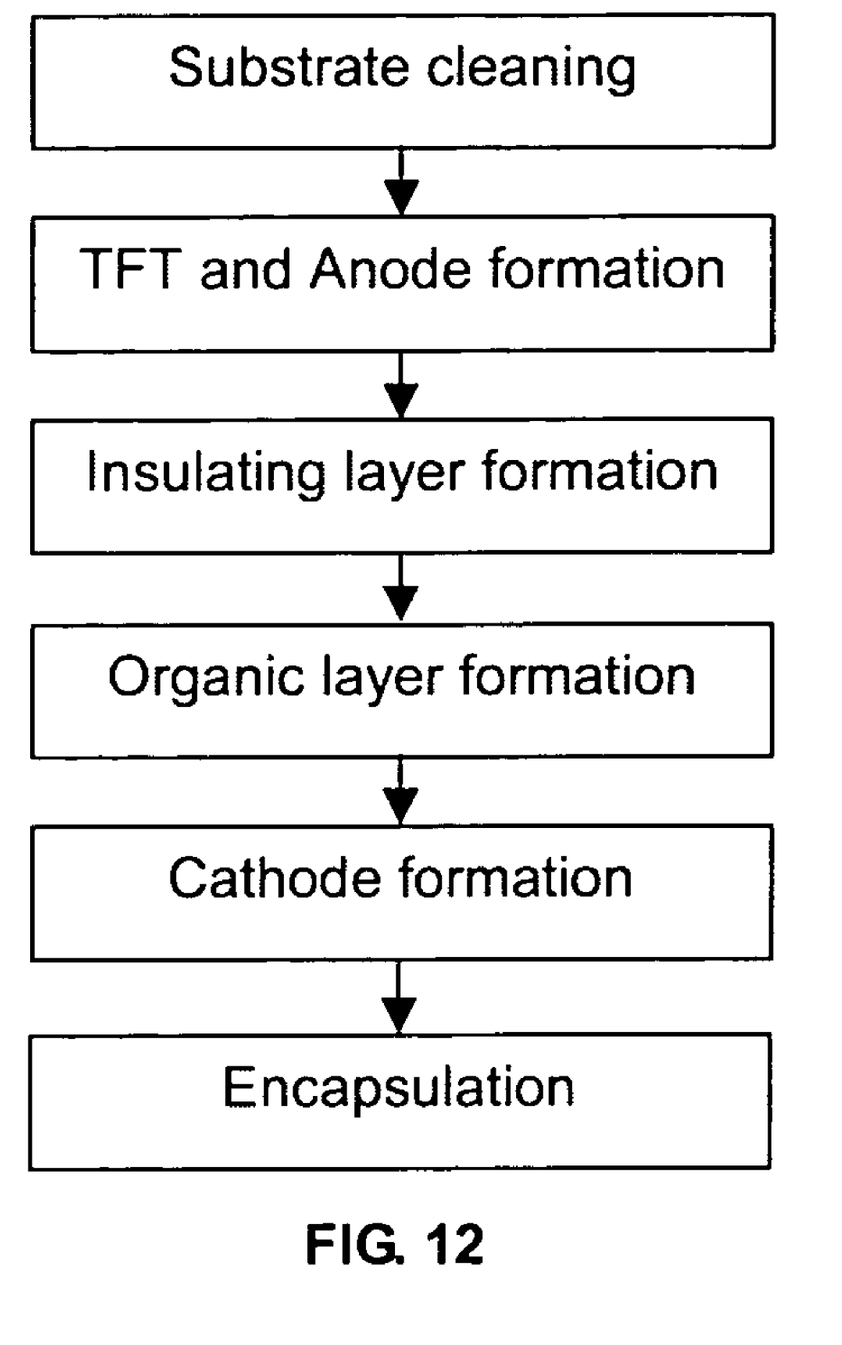
FIG. 12 is a schematic flow diagram representing formation of an AMOLED array on a substrate of the OLED module, in accordance with one embodiment of the present invention.

As shown in FIG. 12, the process for forming an AMOLED module (excluding a digitizer) includes generally the steps of cleaning the substrate 122, forming the anode 129 of the OLED, forming an insulating layer (hole transport layer), forming an organic layer of the OLED layer 116, forming the cathode 128, forming the encapsulating layer 130. There are additional steps not mentioned here, which are required to complete the OLED module 112, but which are not essential to an understanding of the present invention.

Figure 13:
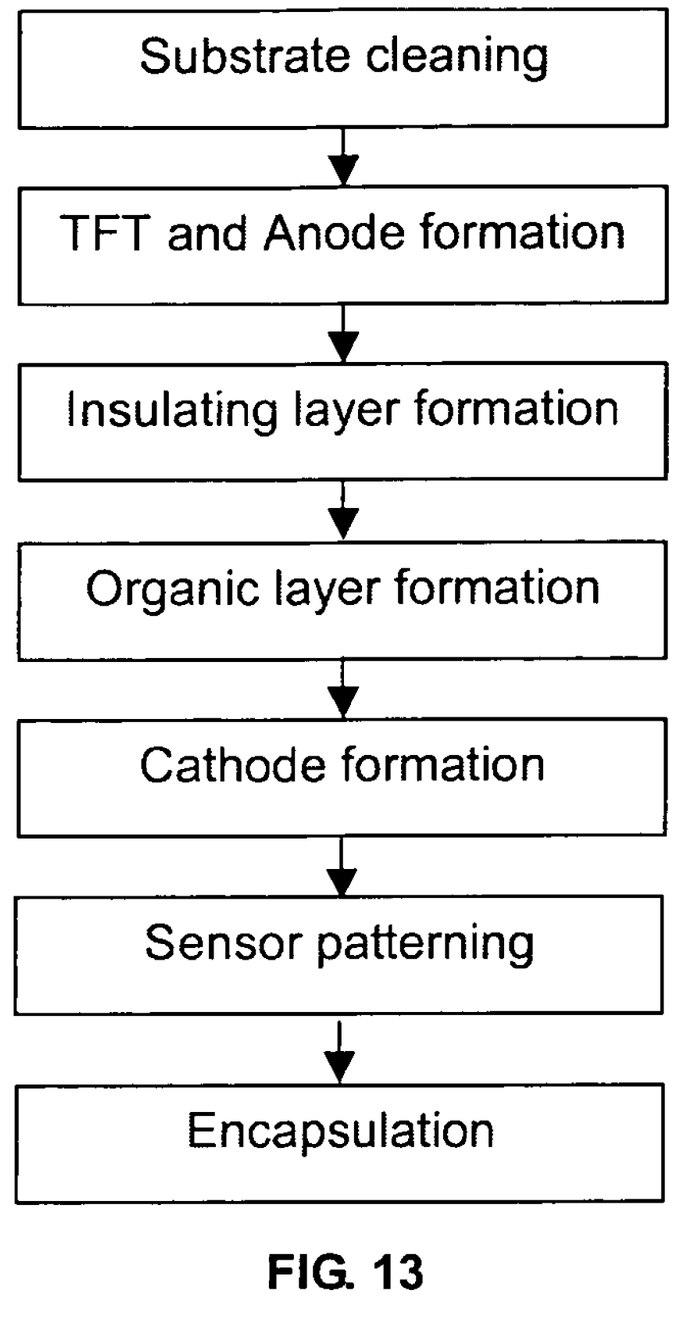
FIG. 13 is a schematic flow diagram representing formation of a digitizer sensor array in association with the formation of the OLED array, in accordance with one embodiment of the present invention.

Referring to FIG. 13, to form the digitizer 18h, the sensor arrays within the digitizer 18h are patterned between formations of the cathode 128 and the encapsulation layer 130, with a dielectric layer between the cathode 128 and the digitizer 18h. Other steps not shown are undertaken to complete the OLED module 112.

Figure 14:
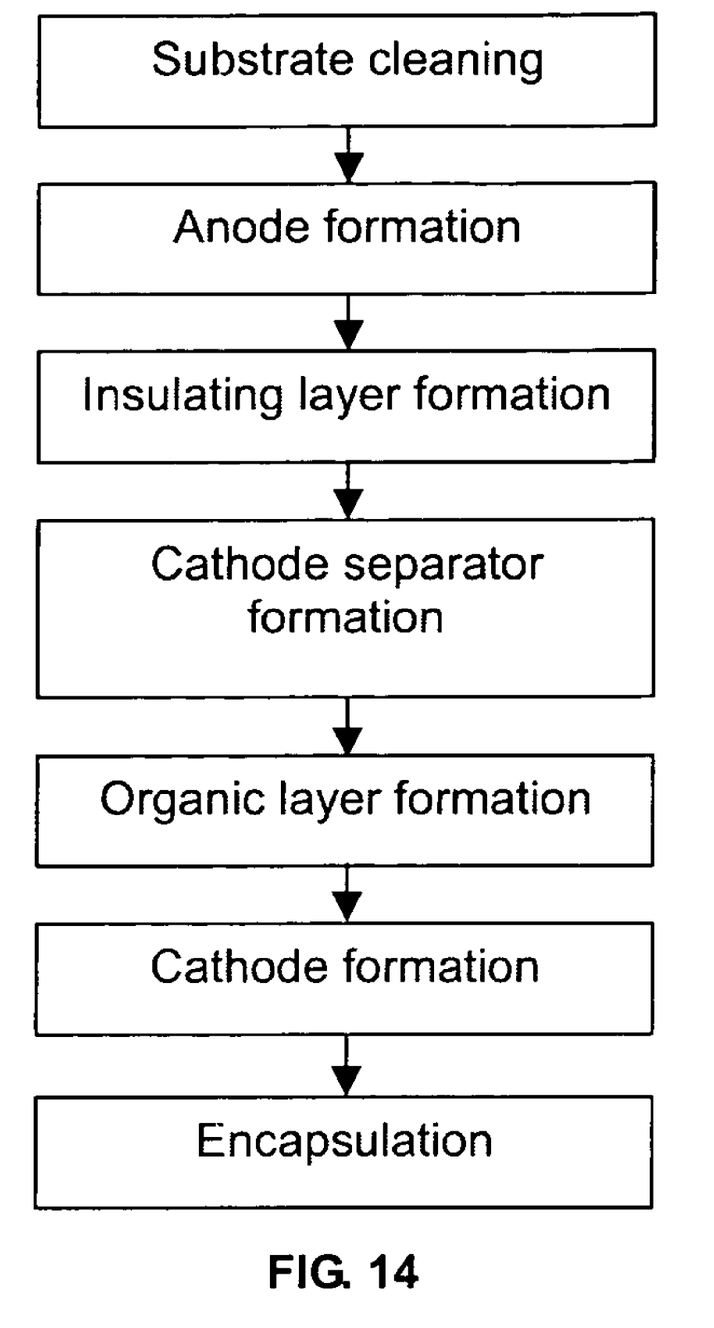
FIG. 14 is a schematic flow diagram representing formation of a PMOLED array on a substrate of the OLED module, in accordance with one embodiment of the present invention.

As shown in FIG. 14, the process for forming a passive matrix OLED (PMOLED) module (not shown in FIG. 11) (excluding a digitizer) includes generally the steps of cleaning the substrate 122, forming an anode of the OLED, forming an insulating layer (hole transport layer), forming a cathode separator, forming an organic layer of the OLED layer, forming a cathode, forming an encapsulating layer. There are additional steps not mentioned here, which are required to complete the OLED module 112, but which are not essential to an understanding of the present invention.

Figure 15:
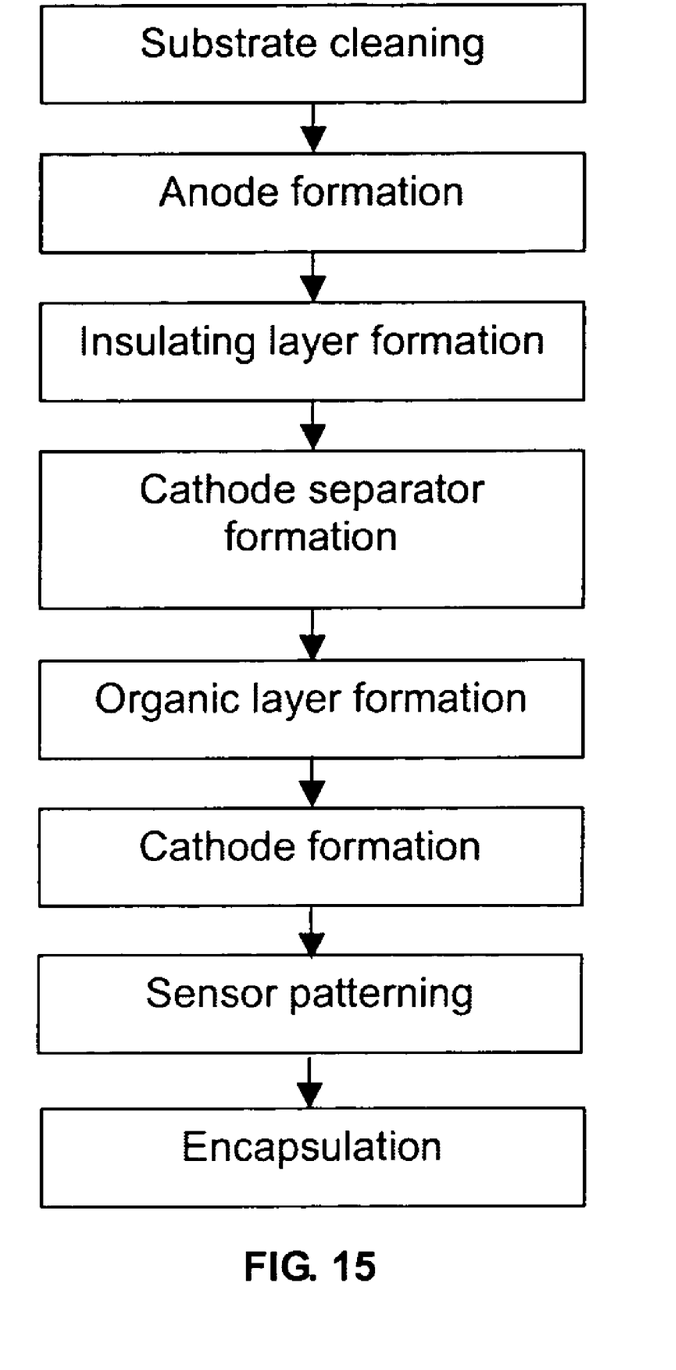
FIG. 15 is a schematic flow diagram representing formation of a digitizer sensor array in association with the formation of the PMOLED array, in accordance with one embodiment of the present invention.

Referring to FIG. 15, to form the digitizer, the sensor arrays within the digitizer are patterned between formations of the cathode 128 and the encapsulation layer, similar to the process discussed in connection with FIG. 13 above. Other steps not shown are undertaken to complete the OLED module 112.

Figure 16:
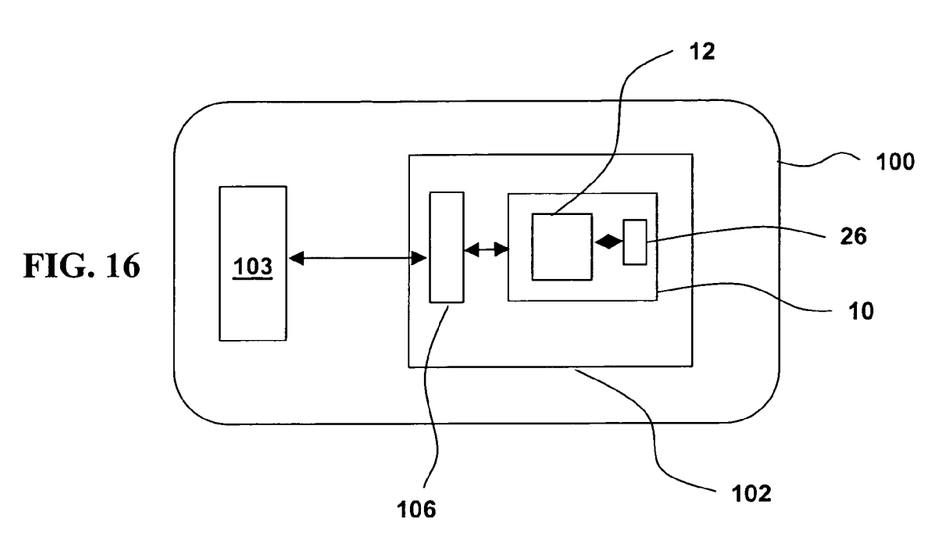
FIG. 16 is a schematic representation of an electronic device incorporating the display device in accordance with one embodiment of the present invention.

FIG. 16 schematically shows an embodiment of an electronic device 100, which includes a display system 102 for displaying images, and an input/output (I/O) controller 103 for providing image data to the display system 102 and instructing the display system 102 to render an image in accordance with the image data. The display system 102 includes the display device 10 (e.g., an LCD device or an OLED display device) in accordance with the present invention and an interface controller 106 exchanging image data and user input data (from the digitizer 18) with the I/O controller 103. The display device incorporates a display module (e.g., an LCD module 12 or an OLED module 112) having an integrated electromagnetic digitizer 18 of the present invention and a controller 26 (e.g., drivers). The electronic device 100 may include a laptop computer, a mobile phone, a digital camera, a personal digital assistant (PDA), a desktop computer, a television, a car display or a portable DVD player.

While particular embodiments of the invention have been described herein for the purpose of illustrating the invention and not for the purpose of limiting the same, it will be appreciated by those of ordinary skill in the art that numerous variations of the details, materials, and arrangements of parts may be made without departing from the scope of the invention as defined in the appended claims.

What is claimed is:

1. A process of forming a digitizer for user input with respect to a display module, comprising:
    providing a display module having a display element, which comprises a first substrate and a second substrate at a distance from the first substrate, defining a space therebetween, in which the display element is supported;
    providing the digitizer in the space defined by the first substrate and second substrate, between the display element and one of the first substrate and second substrate; and
    forming an array of pixel control switches on the first substrate, wherein the digitizer is formed between the array of pixel control switches and one of (a) the display element, and (b) the first substrate.

2. A process as in claim 1, wherein the digitizer comprises an electromagnetic digitizer.

3. A process as in claim 1, wherein the digitizer comprises a sensor array that is formed using a semiconductor process.

4. A process as in claim 3, wherein the semiconductor process includes a photolithography process.

5. A process as in claim 1, further comprising disposing a planarization layer between the array of pixel control switches and the display element, wherein the digitizer is formed between the planarization layer and at least one of: (a) the display element, and (b) the array of pixel control switches.

6. A process as in claim 1, wherein the array of pixel control switches comprises an array of thin film transistors (TFTs).

7. A process as in claim 6, wherein the TFTs are of at least one of LPTS TFT type and a-Si TFT type.

8. A process of forming a display device, comprising:
    providing a display module comprising a digitizer formed according to the process in claim 1; and
    providing a controller operatively coupled to the display module including the digitizer, to synchronize operation of the display element and the digitizer.

9. A process of forming a display system, comprising:
    providing a display device formed according to the process in claim 8; and
    providing an interface controller coupled to the display device, exchanging image data and user input data from the digitizer with a controller in an electronic device.

10. A process of forming an electronic device, comprising:
    providing a display system formed according to the process in claim 9; and
    providing a controller operatively coupled to the interface controller of the display system, to exchange image data and user input data from the electromagnetic digitizer.

11. A process of forming a digitizer for user input with respect to a display module, comprising:
    providing a display module having a display element, which comprises a first substrate and a second substrate at a distance from the first substrate, defining a space therebetween, in which the display element is supported;
    providing the digitizer in the space defined by the first substrate and second substrate between the display element and one of the first substrate and second substrate
    forming an array of pixel control switches on the first substrate, wherein the digitizer is formed between the display element and the second substrate; and forming a color filter layer between the second substrate and the display element, wherein the digitizer is formed between the color filter layer and the display element.

12. A process as in claim 11, wherein the display element comprises a liquid crystal display element.

13. A process as in claim 11, further comprising forming an encapsulating layer between the second substrate and the display element, wherein the digitizer is formed between the encapsulating layer and the display element.

14. A process as in claim 13, wherein the display element comprises an OLED display element.

15. A process for integrating a digitizer in a display module having a display element, comprising:
   providing a first substrate;
   positioning a second substrate at a distance from the first substrate, defining a space therebetween, in which the display element is supported;
   providing the digitizer in the space defined by the first substrate and second substrate, between the display element and one of the first substrate and second substrate; and
   forming an array of pixel control switches on the first substrate, wherein the digitizer is formed between the array of pixel control switches and one of (a) the display element, and (b) the first substrate.

16. A method of providing user input to an electronic device, comprising:
   providing a display module having a display element, which comprises a first substrate, a second substrate positioned at a distance from the first substrate, defining a space therebetween, in which the display element is supported;
   providing a digitizer in the space defined by the first substrate and second substrate, between the display element and one of the first substrate and second substrate; and
   forming an array of pixel control switches on the first substrate, wherein the digitizer is formed between the array of pixel control switches and one of (a) the display element, and (b) the first substrate.

17. A method as in claim 16, wherein the digitizer comprises an electromagnetic digitizer.

18. A method as in claim 17, wherein operation of the digitizer is synchronized to an image displayed by the display module, such that a user can input using the digitizer in response to the image displayed.

* * * * *